United States Patent
Rauch (10) Patent No.: US 11,622,563 B2
(45) Date of Patent: Apr. 11, 2023

(54) ADJUSTABLE I-C-AW KNEADING ECCENTRIC

(71) Applicant: König Maschinen Gesellschaft m.b.H, Graz (AT)

(72) Inventor: Eduard Rauch, St. Margarethen (AT)

(73) Assignee: König Maschinen Gesellschaft m.b.H

( * ) Notice: Subject to any disclaimer, the term of this patent is extended or adjusted under 35 U.S.C. 154(b) by 948 days.

(21) Appl. No.: 16/340,336

(22) PCT Filed: Oct. 6, 2017

(86) PCT No.: PCT/AT2017/060255
§ 371 (c)(1),
(2) Date: Apr. 8, 2019

(87) PCT Pub. No.: WO2018/064698
PCT Pub. Date: Apr. 12, 2018

(65) Prior Publication Data
US 2020/0037619 A1 Feb. 6, 2020

(30) Foreign Application Priority Data
Oct. 7, 2016 (AT) .............................. A 50907/2016

(51) Int. Cl.
*A21C 7/00* (2006.01)
(52) U.S. Cl.
CPC ..................... *A21C 7/005* (2013.01)
(58) Field of Classification Search
None
See application file for complete search history.

(56) References Cited

U.S. PATENT DOCUMENTS 5,486,048 A * 1/1996 Konig ...................... A21C 5/04
366/77

FOREIGN PATENT DOCUMENTS

| DE | 1126333 B | 3/1962 |
| DE | 2850936 A1 | 5/1980 |
| DE | 69320562 T2 | 4/1999 |
| DE | 10306438 A1 | 8/2004 |
| EP | 2708132 A2 | 3/2014 |

OTHER PUBLICATIONS

Koenig DE2850936 English Translation 1980 (Year: 1980).*
(Continued)

*Primary Examiner* — Jacob T Minskey
*Assistant Examiner* — Adrien J Bernard (57) ABSTRACT

A device for kneading dough, in particular a kneading drum, has a rotationally driven inner kneading drum and a rotationally driven outer kneading drum. The inner kneading drum is arranged within the hollow outer kneading drum, in particular in a concentric. The device includes a kneading drive, by means of which the inner kneading drum can be driven or adjusted in an oscillating manner in the direction of the inner kneading drum axis relative to the outer kneading drum and/or so as to carry out a defined deflection at an angle about the axis of the inner kneading drum relative to the outer kneading. The outer kneading drum has a number of kneading recesses which are distributed over the circumference and/or along the length of the outer kneading drum in a uniform manner in.

9 Claims, 8 Drawing Sheets

(56) References Cited

OTHER PUBLICATIONS

Bodenstorfer DE10306438 English Translation 2004 (Year: 2004).*
Engelmeier EP2708132 English Translation 2014 (Year: 2014).*
International Search Report and Translation Application No. PCT/AT2017/060255 Completed: Dec. 7, 2017; dated Dec. 14, 2017 7 pages.
Written Opinion of the International Searching Authority Application No. PCT/AT2017/060255 Completed: Dec. 7, 2017; dated Dec. 14, 2017 6 pages.

* cited by examiner

ADJUSTABLE I-C-AW KNEADING ECCENTRIC

TECHNICAL FIELD

The present teaching relates to a device for kneading dough.

BACKGROUND

An abundance of devices are known from the prior art, for instance circular kneading devices or drum circular kneading appliances, with which dough is ground or kneaded, that is, portioned dough pieces are brought into a desired shape, or in particular are circularly kneaded, and in some cases their consistency is modified or improved. For example, the prior art includes well-known so-called kneading drums, with which pre-portioned dough pieces can be kneaded into ball-shaped pastries. Kneading drums of this kind, known from the prior art, comprise an inner and an outer kneading drum, which are moved in relation to one another by a kneading eccentric, such that dough is introduced into receiving openings configured in the outer kneading drum and is kneaded in contact with the inner kneading drum and the relative movement with respect to the outer kneading drum in connection with a surrounding belt. The disadvantage with devices known from the prior art is that nearly every produced pastry weight requires its own suitable kneading drum and an individually specified kneading eccentric, which produces the oscillating movement of the inner kneading drum. Because dough portioning and kneading machines are outfitted with ever increasing weight categories, or are intended for operating in constantly larger weight categories, there is a need for a considerable number of outer kneading drums as well as inner kneading drums and kneading eccentrics adapted to them. The consequence is high costs and adaptation expense, and these non-adjustable kneading drums, or those that must be adjusted to the individual weight of the dough pieces, do not lead to optimal kneading results.

SUMMARY

It is therefore one object of the present teaching to obtain a device of the aforementioned type, which makes possible the processing or kneading of dough pieces in a wide range of weights.

This object is achieved by the defining features of the present teaching. The present teaching foresees that the deflection of the kneading drive is adjustable, such that the eccentric crank is mounted to rotate eccentrically in a setting shaft, such that the setting shaft is installed rotatably in the eccentric drive shaft of the eccentric crank in such a way that, upon rotation of the setting shaft in relation to the eccentric drive shaft, the position of the crank protrusion is shifted with respect to the rotation axis of the eccentric drive shaft of the eccentric crank, and thus the deflection of the inner kneading drum with respect to the outer kneading drum is modified. The term "deflection" is understood in this context to refer to the extent of the movement of the inner kneading drum relative to the outer kneading drum, in each case along the axis of the inner kneading drum and/or also around an angle in the axis of the inner kneading drum.

The adjustability of the deflection of the inner kneading drum to the outer kneading drum makes it possible, without replacing individual components, to adapt the kneading movement to the weights of the individual dough pieces.

Thanks to the eccentric installation of the eccentric crank in the setting shaft, simple adjustability of the kneading deflection becomes possible, and it can occur even during the ongoing operation of the kneading drum. Thus the kneading deflection of the inner kneading drum can be adjusted, corresponding to the size of the outer kneading drum, the weight per piece, the dough consistency and the tension in the dough of the dough pieces to be produced, so that the number of required kneading drums is minimized. In addition, the kneading deflection can be adjusted to the dough consistency, in particular the tension in the dough pieces, resulting in an increase in quality of the produced dough pieces. Because the kneading process is situated at the beginning of the production chain, an optimal kneading outcome is a prerequisite for the quality of the baked goods produced from the dough pieces. Thanks to the inventive features, it is also possible to automatically shift the kneading deflection, thus reducing the set-up time and, for example, allowing, depending on each dough, a specific program to be kept on file and retrieved when needed. By avoiding set-up time and thanks to the possibility of storing individual adjustments, no specialist personnel are required and 100 percent reproducibility of the settings and thus of the kneading process is assured.

Advantageous rotation of the setting shaft to the eccentric drive shaft becomes possible, and thus the shifting of the eccentricity of the eccentric crank, if the kneading drive includes an adjustment device that is configured in such a way that the setting shaft can be aligned to the eccentric drive shaft at a defined angle.

An advantageous embodiment of the present teaching calls for the eccentric drive shaft of the eccentric crank to be rotatably connected with the eccentric drive by a large pair of bevel wheels, in particular by a large drive shaft.

Powering the eccentric crank by a pair of bevel wheels allows compact execution of the kneading drive and simple positioning of the other drive elements of the eccentric drive.

The structural size of the device can be reduced further if the setting shaft is rotatably connected by a small pair of bevel wheels with the eccentric drive, such that, in particular, the small drive shaft of the small pair of bevel wheels is positioned and mounted in the large drive shaft of the large pair of bevel wheels, which is configured as a hollow shaft.

In particular, the mounting of the small drive shaft in the large drive shaft, which is configured as a hollow shaft, makes possible a simple and especially compact realization of the kneading drive as well as advantageous positioning of the drive means.

It is possible to dispense with a separate drive for the setting shaft or the small drive shaft, if the setting shaft, in particular the small drive shaft, can be connected with the eccentric drive by a coupling, in particular multiple-point coupling, via torque transmission. By this means, in addition, the power drive of the small drive shaft or of the setting shaft can be synchronized with the eccentric drive or the power drive for the eccentric crank.

An advantageous embodiment of the present teaching is obtained if the coupling is configured as spring-loaded magnetic coupling, such that the connection of the eccentric drive with the setting shaft, in particular the small drive shaft, is configured in such a way that upon actuation of the magnet of the magnetic coupling, the connection of the eccentric drive with the setting shaft, in particular the small drive shaft, is severed.

It is advantageous to foresee that the eccentric crank is connected with the eccentric drive shaft by a single universal joint for centerpoint compensation.

The single universal joint makes it possible to shift the eccentric crank in relation to the drive shaft, such that it becomes easily possible simultaneously to include the eccentric crank by means of the drive shaft and thus the power drive of the kneading drive.

In an especially compact embodiment, small in structure, the kneading drive is mounted in a gearbox and supported, such that the gearbox is connected with the power drive of the outer kneading drum, so that the gearbox rotates along with the latter in driving the outer kneading drum.

Simple coupling of the eccentric drive with the power drive of the outer kneading drum becomes possible if the kneading drive, especially the eccentric drive, includes a belt drive that is coupled with the power drive of the outer kneading drum.

An advantageous embodiment of the inventive device foresees that the inner kneading drum is connected with the power drive of the outer kneading drum, in particular the gearbox of the kneading drive, so that the inner kneading drum rotates along with the outer kneading drum. It thereby becomes possible for the inner kneading drum, the outer kneading drum and the kneading drive to be controlled and powered with only one drive means.

To allow the device to be adjusted to an even greater range of weights of dough pieces, it is foreseen that the inner kneading drum and the outer kneading drum are releasably and replaceably disposed on the device, so that kneading drums with varying dimensions can be secured on the device.

An advantageous application of the inventive device or an advantageous device for processing and kneading dough is obtained if a device of this type includes an inventive device, such that the outer kneading drum is at least partly surrounded on its periphery by a belt and such that dough from a kneading drum can be introduced into the kneading chambers of the device.

Additional advantages and configurations of the present teaching can be seen from the description and associated drawings.

BRIEF DESCRIPTION OF THE DRAWINGS

The present teaching is schematically depicted hereinafter with reference to the particularly advantageous embodiments, which however are not to be considered restrictive, in the drawings and it is described by way of example with reference to the drawings, which are as follows.

DETAILED DESCRIPTION

Figure 1:
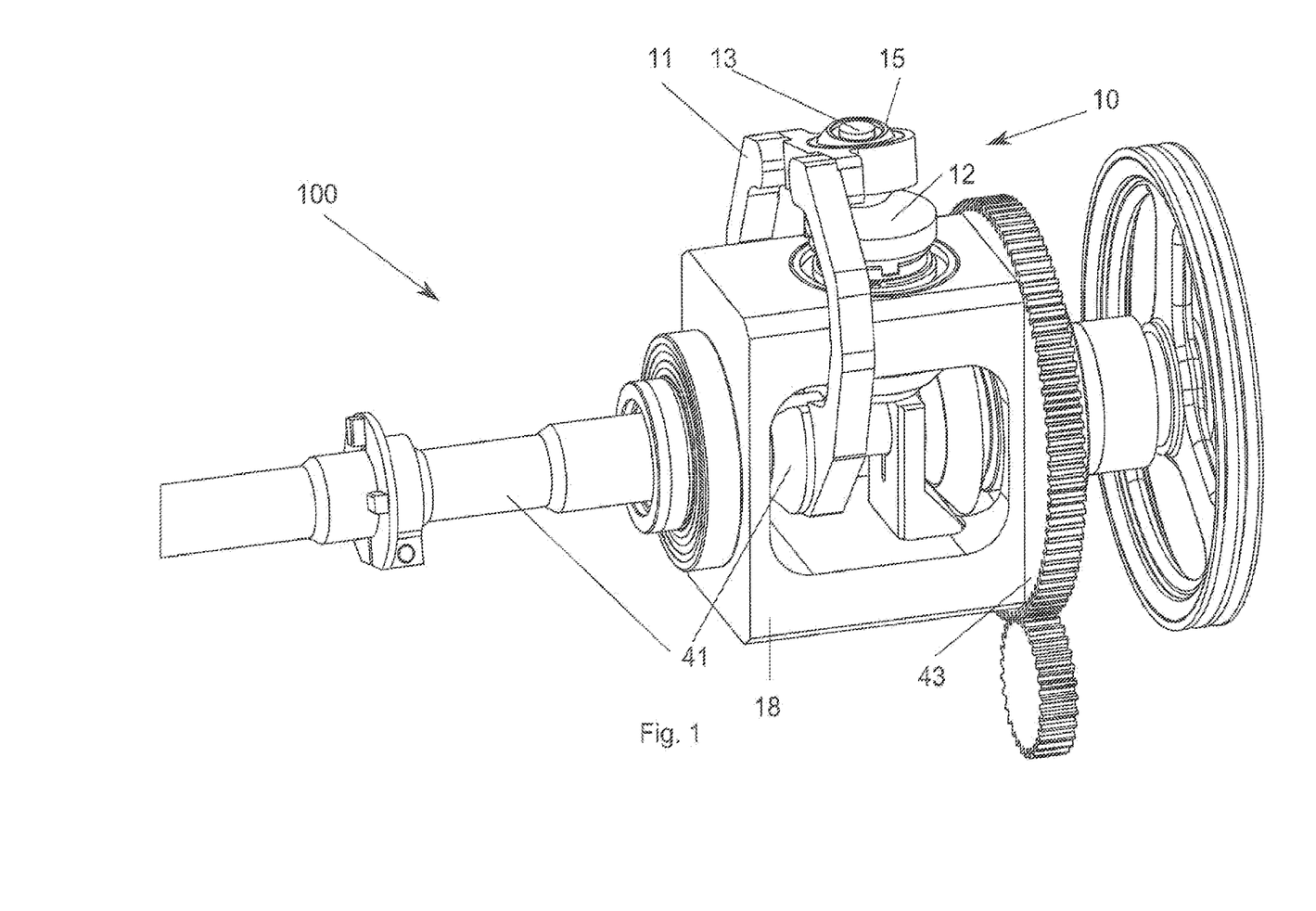
FIG. 1 shows an isometric view of an inventive device.

Shown in FIG. 1 is an isometric view of an embodiment of the inventive device 100 for kneading dough. The device 100 includes an inner kneading drum 1 and an outer kneading drum 2 (FIG. 2), which are arranged in a concentric manner with one another, such that the inner kneading drum 1 is installed inside the hollow outer kneading drum 2. The device 100 further includes a kneading drive 10 with which the inner kneading drum 1 can be adjusted in an oscillating manner in the direction of its axis relative to the outer kneading drum 2 and to carry out a defined deflection at an angle about its axis relative to the outer kneading drum 2. The kneading drive 10 includes a kneading lever 11, which is connected at one end with the shaft 41 of the inner kneading drum 1 and, with the end of the kneading lever 11 opposite the inner kneading drum 1, is connected via a ball joint 15 with the crank protrusion 13 of an eccentric crank 12.

Figure 2:
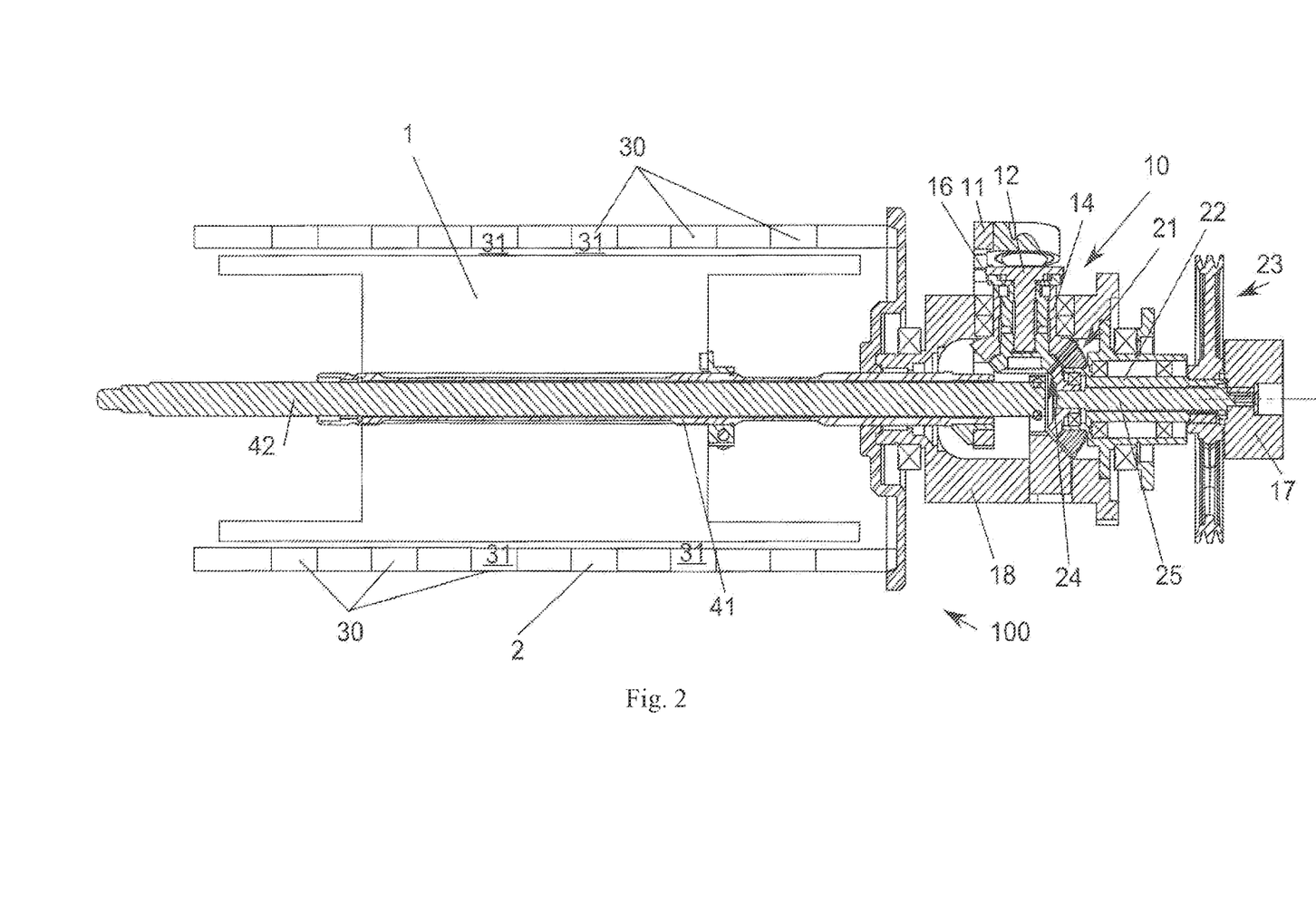
FIG. 2 shows a section view of the embodiment illustrated in FIG. 1.

FIG. 2 shows a section view of the embodiment of the inventive device 100 that is depicted in FIG. 1. The inner kneading drum 1 is mounted on the shaft 41, which is configured as a hollow shaft and can be pushed on a guide shaft 42 in its axis and thus the axis of the inner kneading drum 1. The outer kneading drum 2 is hollow and mounted in concentric manner with the inner kneading drum 1. The outer kneading drum 2 comprises a number of kneading recesses 30, in this embodiment twelve kneading recesses 30, which are distributed uniformly about the periphery and along the length of the outer kneading drum 2. The kneading recesses 30 completely pass through the outer kneading drum 2, thus configuring an access from the peripheral area of the outer kneading drum 2 to the inner kneading drum 1. The kneading recesses 30 thus constitute with the inner kneading drum 1 a number of kneading chambers 31 corresponding to the number of the kneading recesses 30. Pre-measured dough portions can be introduced into the kneading chambers 31, said portions being kneaded or shaped by the oscillating relative motion of the inner kneading drum 1 with respect to the outer kneading drum 2.

The kneading drive 10 is mounted or supported in a gearbox 18. The gearbox 18 is driven by a cogwheel 43 secured to the gearbox 18 and is co-rotated or rotated with the outer kneading drum 2.

Figure 3:
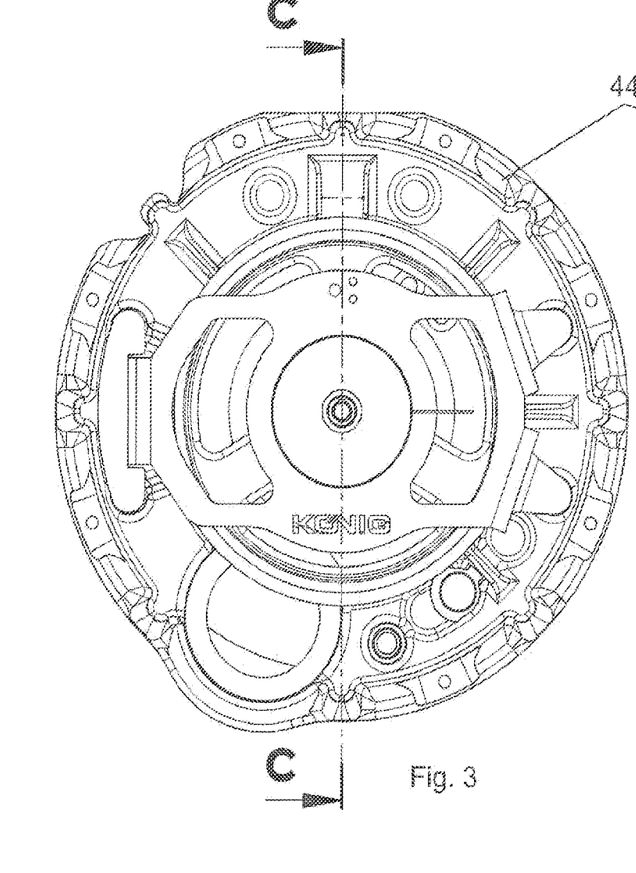
FIGS. 3 and 4 show an embodiment of the gear housing of the inventive device as a ground plan and an elevation sketch.
Figure 4:
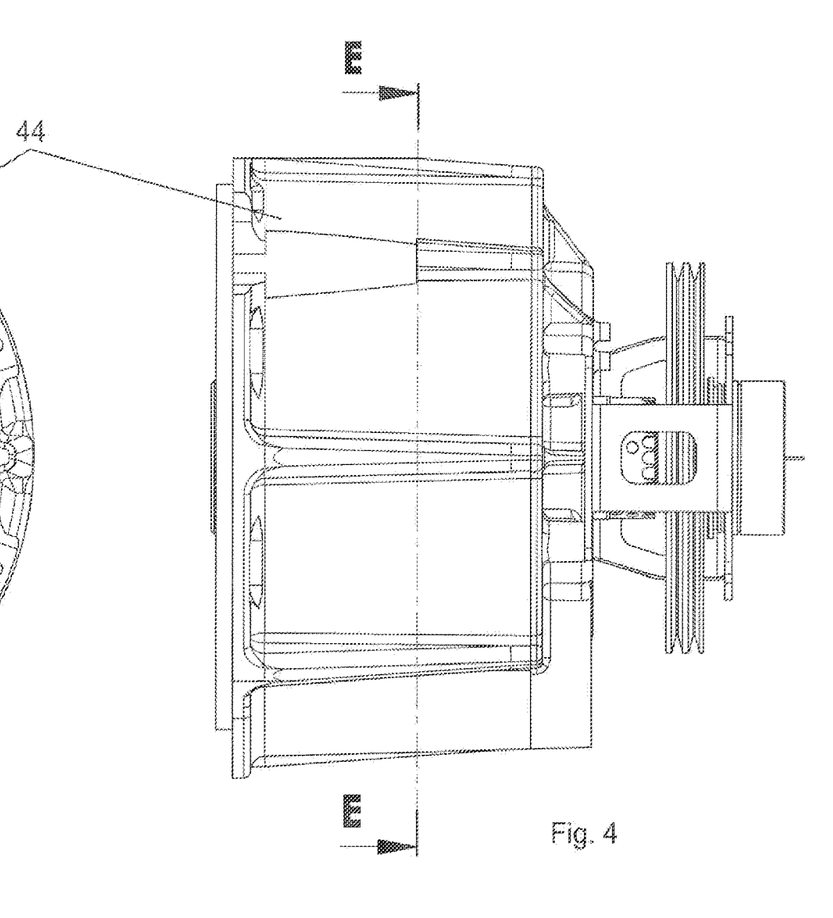

The gear housing 44 of the device 100 is depicted in FIGS. 3 and 4. The kneading drive 10 is mounted inside the gear housing 44 of the device 100, and positioned to rotate along with the outer kneading drum 2, the inner kneading drum 1 and the kneading drive 10.

Figure 5:
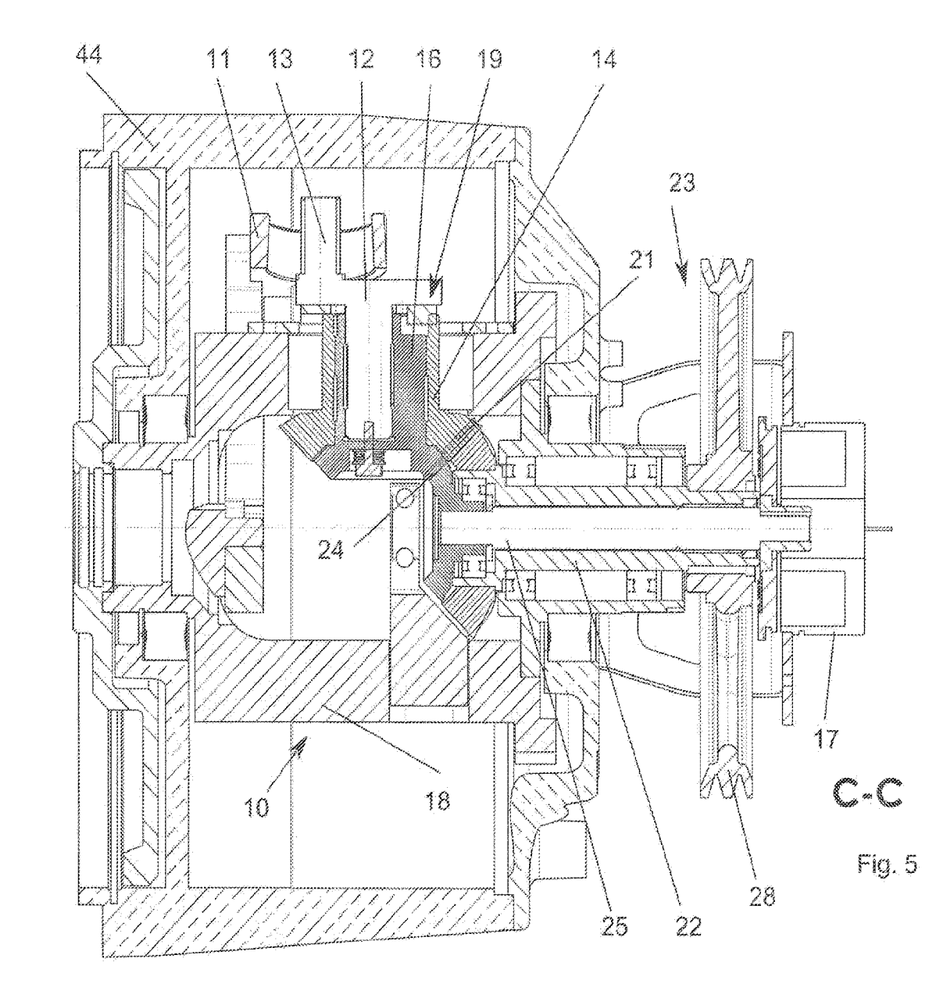
FIG. 5 shows a section view of the embodiment depicted in FIGS. 3 and 4.

FIG. 5 shows a full sectioning along the section lines C-C drawn in FIG. 3, without the outer kneading drum 2 and inner kneading drum 1. The kneading drive 10 includes a setting shaft 16 in which the eccentric crank 12 is eccentrically rotatably mounted. The setting shaft 16 itself is rotatably mounted in the eccentric drive shaft 14, such that the axis of the setting shaft 16 is positioned concentrically with the axis of the eccentric drive shaft 14. A small pair of cogwheels 24 is mounted on the end of the setting shaft 16 opposite the crank protrusion 13. The setting shaft 16 is connected with a small drive shaft 25 by the small pair of cogwheels 24. The eccentric drive shaft 14 is connected with the eccentric crank 12 by a single universal joint 19, so that the rotation of the eccentric drive shaft 14 leads to rotation of the eccentric crank 12. The single universal joint 19 allows a radial shift of the eccentric crank 12 relative to the eccentric drive shaft 14 and simultaneously allows a transmission of torque from the eccentric drive shaft 14 to the eccentric crank 12. A large pair of cogwheels 21, mounted on the end of the eccentric drive shaft 14 opposite the eccentric crank 12, connects the eccentric drive shaft 14 with a large drive shaft 22. The small drive shaft 25 of the small pair of cogwheels 24 is positioned in the large drive shaft 22, a hollow shaft, of the large pair of cogwheels 21 and rotatably mounted in it. A pulley 28 of the eccentric drive 23 is positioned on the end of the large drive shaft 22 opposite the large pair of cogwheels 21. The large drive shaft 22 is coupled by the pulley 28 with the power drive of the outer kneading drum 2 by way of a belt drive. Positioned on the end of the small drive shaft 25 opposite the small pair of cogwheels 24 is a coupling 17, by which the small drive shaft 25 can be connected with the large drive shaft 22 or with the pulley 28 or with the eccentric drive 23.

In this embodiment the coupling 17 is configured as a spring-loaded magnetic coupling, such that, with the electro-magnets disconnected, that is, in a condition without electric power, the coupling 17, by means of the spring mounted in the coupling 17, produces the connection between the large drive shaft 22 and the small drive shaft 25 or between the small drive shaft 25 and the eccentric drive 23. If at this point the electro-magnet of the coupling 17 is actuated, then the connection between the small drive shaft 25 and the large drive shaft 22 is severed and a relative movement of the large drive shaft 22 with respect to the small drive shaft 25 becomes possible. The coupling 17 can thus produce the contact between the small drive shaft 25 and the large drive shaft 22 by forming two cogwheel connections or other connecting elements known from the prior art. Alternatively, the coupling 17 can also function conversely, that is, in a currentless state, severing the connection of the small drive shaft 25 from the large drive shaft 22 or eccentric drive 23 and, contrary to it, severing the connection of the small drive shaft 25 with the large drive shaft 22 by spring-loading the coupling 17 in a currentless state. Alternatively, the coupling 17 can be configured as another coupling known from the prior art, for example as a multi-plate clutch, claw coupling or other types of coupling that can establish a dissoluble, adjustable connection, such as a setting gear, locking lever and the like, between the small drive shaft 25 and the large drive shaft 22.

Figure 6:
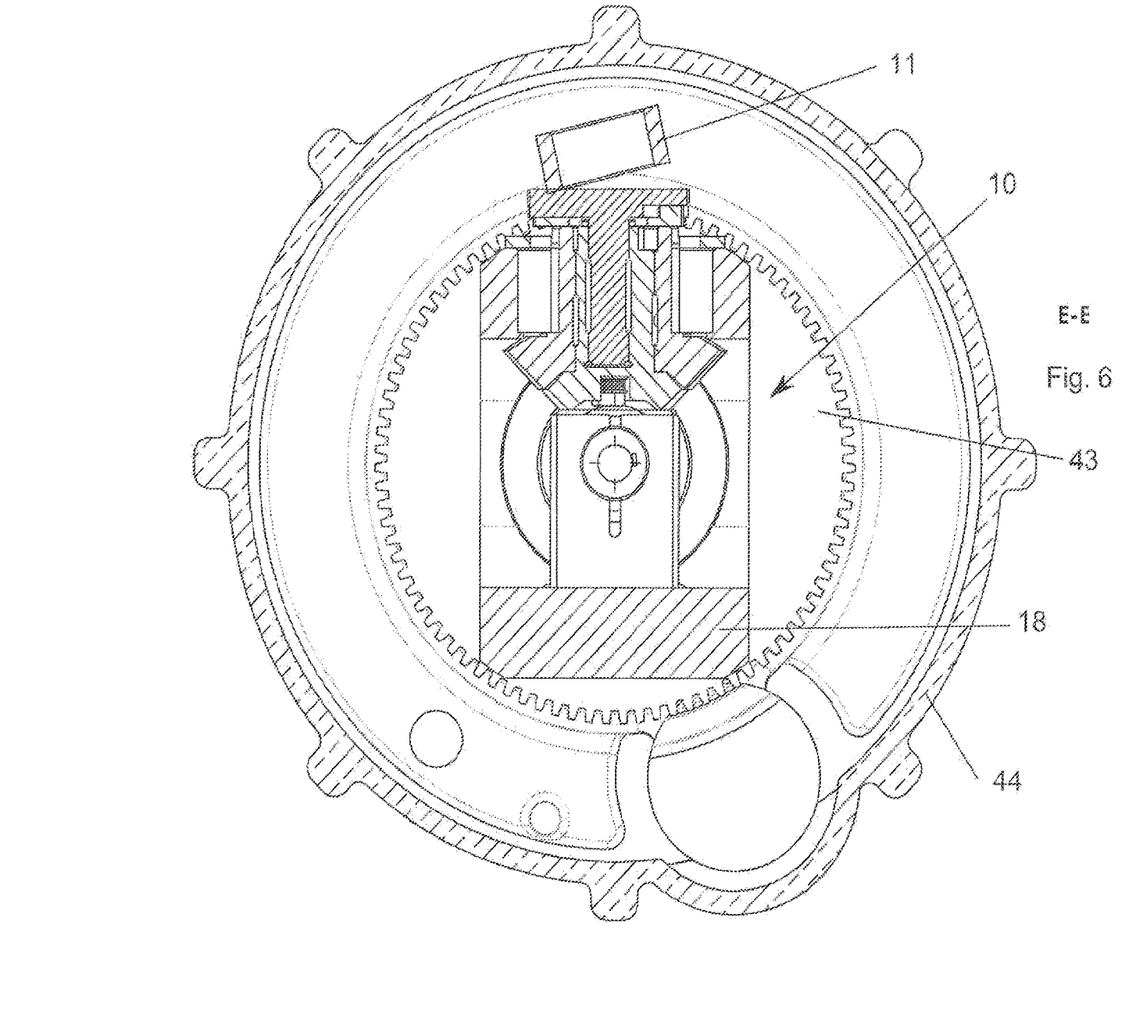
FIG. 6 shows a section view E-E according to FIG. 4.

FIG. 6 depicts a section view along the section axis E-E according to FIG. 4. The gearbox 18 of the kneading drive 10, mounted inside the gear housing 44, is rotated by the cogwheel 43 in the gear housing 44 of the device 100, such that the kneading lever 11, which is fastened to the inner kneading drum 1, is rotated along with the kneading drive 10.

Hereinafter, the functioning of the preferred embodiment, described in FIGS. 5 and 6, of the inventive device 100 is described with reference to FIGS. 7 through 11.

Figure 7:
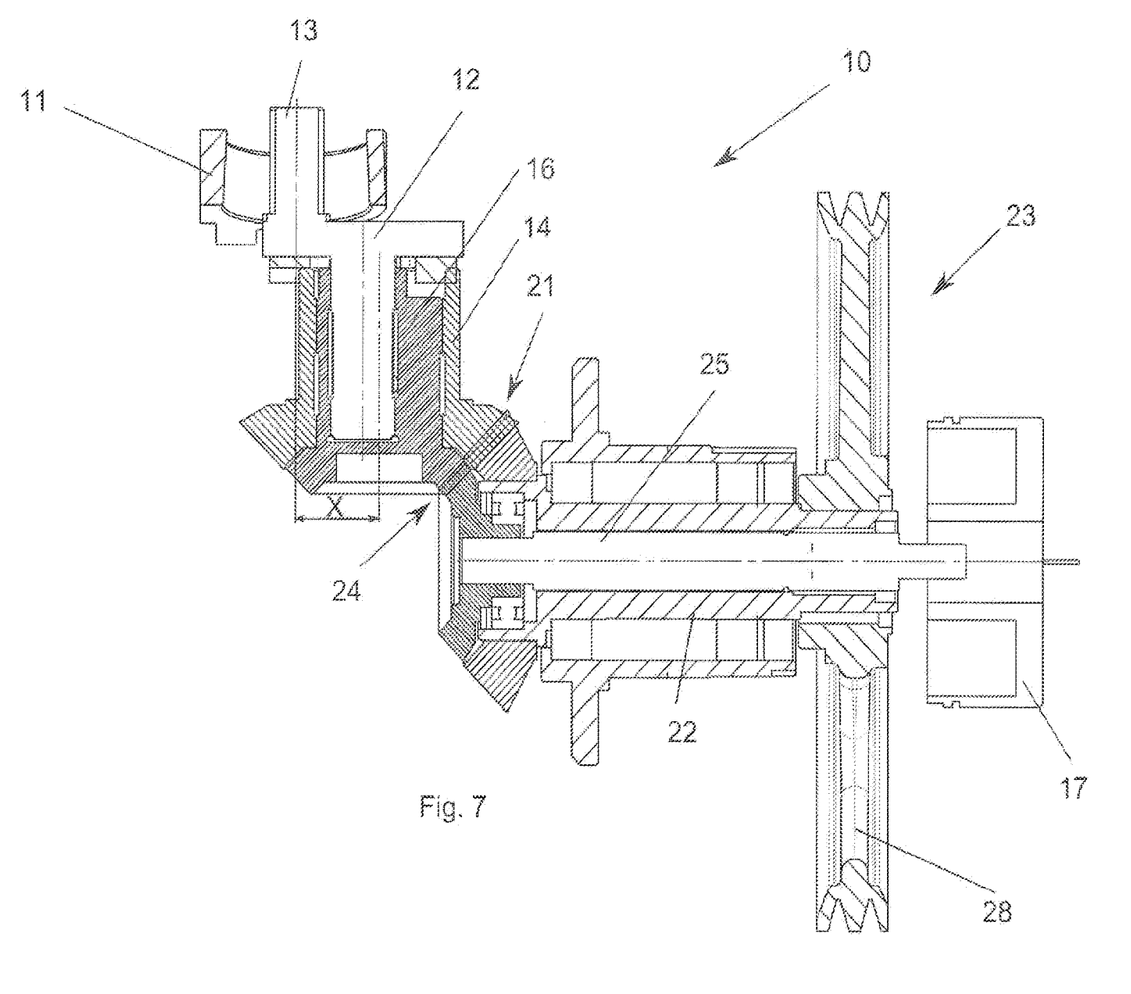
FIG. 7 shows a detail view of the kneading drive.

As shown in FIG. 7, with the coupling 17 opened, or with the magnetic coupling in currentless state, the connection between the small drive shaft 25 and the large drive shaft 22 is established, such that the small drive shaft 25 rotates with the large drive shaft 22. The eccentric drive 23, by means of the pulley 28, propels the large drive shaft 22 and thus the small drive shaft 25. The eccentric drive shaft 14 rotates on its axis by means of the large pair of cogwheels 21, and the eccentric crank 12 is propelled by the single universal joint 19. Upon rotation of the eccentric crank 12, the crank protrusion 13 makes a circular movement, so that the kneading lever 11 is shifted along a circular track and the inner kneading drum 1 rotates about its axis relative to the outer kneading drum 2 and simultaneously the inner kneading drum 1 is pushed along its axis or is shifted while oscillating. As a result of the closed connection of the small drive shaft 25 with the large drive shaft 22, the small pair of cogwheels 24 rotates along with the large pair of cogwheels 21 at the same angular speed, so that the setting shaft 16 is co-rotated with the same angular speed as the drive shaft 14 and thus with the same angular speed as the eccentric crank 12. Upon common rotation of the setting shaft 16 with the eccentric drive shaft 14 or the eccentric crank 12, the eccentricity X (FIG. 7) of the eccentric crank 13 to the rotation axis of the eccentric drive shaft 14 or the eccentricity of the eccentric crank to the rotation axis of the setting shaft 16 is maintained and thus the kneading deflection of the inner kneading drum 1 is kept constant.

If at this point the coupling 17 or the magnet of the magnetic coupling is actuated, the connection between the small drive shaft 25 and the large drive shaft 22 is severed. As a result of severing the connection between the small drive shaft 25 and the large drive shaft 22, the large drive shaft 22 is rotated by the eccentric drive 23 or pulley 28 relative to the small drive shaft 25. Thanks to the relative rotation of the large drive shaft 22 with respect to the small drive shaft 25, the large pair of cogwheels 21 is rotated in relation to the small pair of cogwheels 23. Thus, by means of the eccentric drive shaft 14, the eccentric crank 12, mounted eccentrically in the setting shaft 16, is rotated or shifted relative to the setting shaft 16 by a defined angle to the latter. The setting shaft 16 or its eccentric recess, in which the eccentric crank 12 is mounted, is shifted or rotated in the eccentric drive shaft 14 by means of the eccentric mounting of the eccentric crank 12 in the setting shaft 16 and the free running of the small pair of cogwheels 23 or their drive shaft 25 caused by the released coupling 17. The eccentricity x of the eccentric crank 12 and thus the deflection of the crank protrusion 13 is modified by the rotation of the setting shaft 16 relative to the eccentric drive shaft 14. If at this point the required eccentricity X is reached, the coupling 17 is closed again and the setting shaft 16 rotates again with the eccentric drive shaft 14, so that the eccentricity X is held constant.

Figure 8:
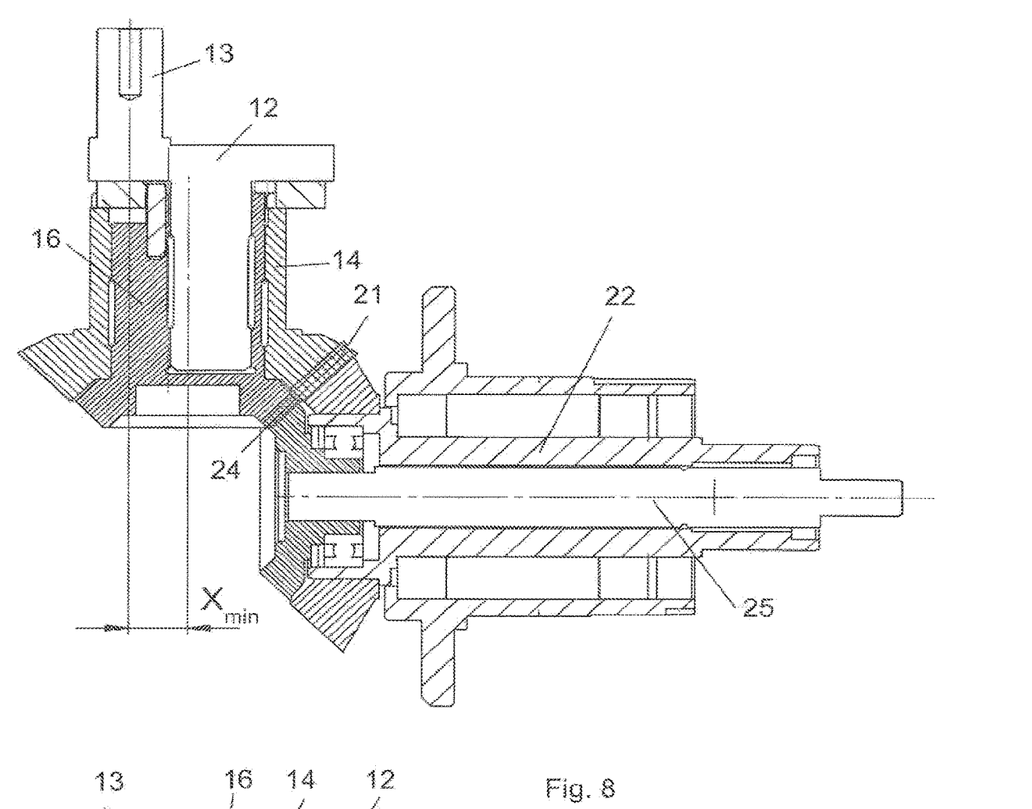
FIGS. 8 and 9 show the kneading drive with minimal eccentricity in a section view and a detail view.
Figure 9:
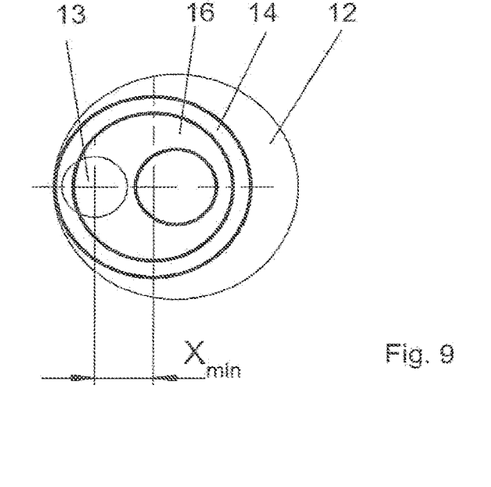
Figure 10:
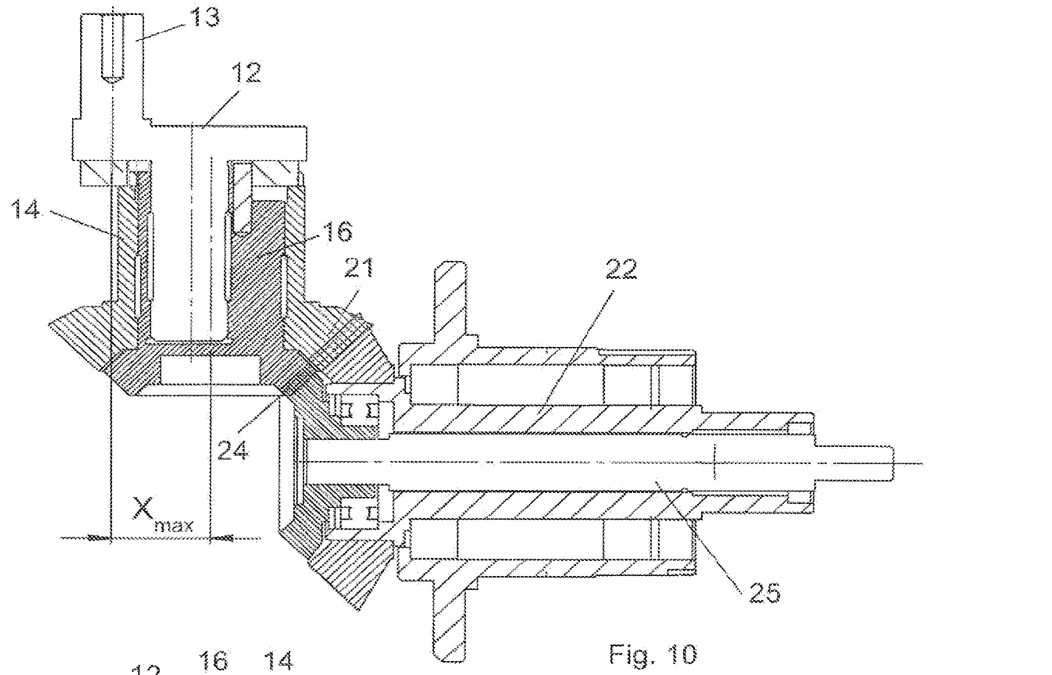
FIGS. 10 and 11 show the kneading drive with maximum eccentricity in a section view and a detail view.
Figure 11:
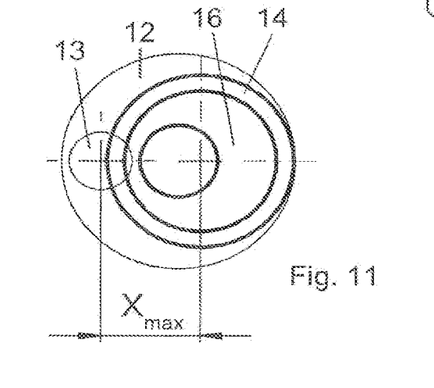

The minimal eccentricity $X_{min}$ of the eccentric crank 12 in relation to the setting shaft 16 is depicted in FIGS. 8 and 9. The maximal eccentricity $X_{max}$ of the eccentric crank 12 in relation to the setting shaft 16 or to the rotary axis of the eccentric drive shaft 14 is shown in FIGS. 10 and 11. Because of the rotation of the crank protrusion 13 about the center axis of the eccentric drive shaft 14, the inner kneading drum 1 is pushed or oscillated by the kneading lever 11 in a rotation of the eccentric drive shaft 14 around the doubled mass of the adjusted eccentricity X in its axis by the hollow shaft 41 (FIG. 2) relative to the outer kneading drum 2. By the rotation of the eccentric crank 12 or of the crank protrusion 13, the kneading lever 11 likewise is shifted by oscillation about the axis of the inner kneading drum 1, as is the inner kneading drum 1 about its own axis relative to the outer kneading drum 2. The inner kneading drum 1 thus completes a wobbling elliptical movement relative to the outer kneading drum 2 and allows especially advantageous kneading of the dough pieces introduced into the kneading chambers 31.

A preferred application of the inventive device 100 foresees that the latter is included in a device for treating and portioning dough, such that the outer kneading drum 2 is surrounded by a belt and the dough pieces are introduced, for instance from a dough drum, in defined portions into the kneading chambers 31 of the device 100. The device 100 is then co-rotated by means of the belt or with the belt and, by the relative movement of the inner kneading drum 1 in relation to the outer kneading drum 2, the dough pieces introduced into the kneading chambers 31 are shaped or kneaded and, after a defined rotation of the device 100 by an angle, are then removed by means of the belt from the kneading chambers 31 of the device 100.

Alternatively to the shifting by means of the small pair of cogwheels 24 and the large pair of cogwheels 21, the eccentric crank 12 can be rotated relative to the setting shaft 16, for example directly by an electro-motor, or other gearbox forms known from the prior art can be foreseen in place of the pairs of cogwheels.

An alternative embodiment foresees that the kneading drive 10 includes an adjusting device, with which the setting shaft 16 can be shifted by a defined angle with respect to the eccentric drive shaft 14. Thus, for example, the small pair of cogwheels 24 can include a separate power drive, which is powered in the same way as the power drive of the large pair of cogwheels 21, so that the small pair of cogwheels 24 rotates with the same angular speed as the large pair of cogwheels 21 and at a required shift the angular speed of the small pair of cogwheels 24 is modified relative to the angular speed of the large pair of cogwheels 21. In addition, an alternative calls for the setting shaft 16 to be driven directly, for example by an electro-motor, and in that way the shifting of the setting shaft 16 occurs with respect to the eccentric drive shaft 14.

What is claimed is:

1. A device for kneading dough, comprising a rotationally driven inner kneading drum and a rotationally driven outer kneading drum, such that the inner kneading drum is arranged inside the hollow outer kneading drum, wherein the device includes a kneading drive, by which the inner kneading drum can be driven or adjusted in an oscillating manner in the direction of the inner kneading drum axis relative to the outer kneading drum so as to carry out a defined deflection at an angle about the axis of the inner kneading drum relative to the outer kneading drum, whereby the outer kneading drum has a number of kneading recesses which are distributed over the circumference and/or along the length of the outer kneading drum in a uniform manner, wherein the kneading recesses are designed such that a number of kneading chambers, said number corresponding to the number of kneading recesses, are formed between the outer kneading drum and the inner kneading drum, and a respective portion of dough can be introduced into each kneading chamber, said portion of dough being kneaded by the oscillating movement of the inner kneading drum relative to the outer kneading drum, whereby the kneading drive includes a kneading lever which is connected to the inner kneading drum at one end and is hinged to the crank protrusion of an eccentric crank at the other end, wherein the protrusion of the kneading drive is adjustable, whereby the eccentric crank is mounted in an eccentrically rotatable manner in a setting shaft, and the setting shaft is rotatably mounted in an eccentric drive shaft of the eccentric crank such that the position of the crank protrusion is adjusted relative to the rotational axis of the eccentric drive shaft of the eccentric crank, thus modifying the deflection of the inner kneading drum relative to the outer kneading drum, when the setting shaft is rotated relative to the eccentric drive shaft, wherein the eccentric drive shaft of the eccentric crank is rotatably connected with the eccentric drive by a first pair of cogwheels, wherein the setting shaft is rotatably connected with the eccentric drive by a second pair of cogwheels, such that a drive shaft of the second pair of cogwheels is positioned and mounted in a hollow drive shaft of the first pair of cogwheels, wherein the setting shaft can be connected by a coupling with the eccentric drive in a manner capable of transmitting torque.

2. The device according to claim 1, wherein the kneading drive includes an adjustment device, which is configured in such a way that the setting shaft can be adjusted by a defined angle relative to the eccentric drive shaft.

3. The device according to claim 1, wherein the coupling is configured as a spring-loaded magnetic coupling, such that the connection of the eccentric drive with the setting shaft is configured in such a way that upon actuation of the magnet of the magnetic coupling, the connection of the eccentric drive with the setting shaft is severed.

4. The device according to claim 1, wherein the eccentric crank is connected with the eccentric drive shaft by a joint for centerpoint compensation.

5. The device according to claim 1, wherein the kneading drive is mounted and supported in a gearbox, such that the gearbox is connected with the drive an outer kneading drum, so that the gearbox co-rotates with the outer kneading drum upon driving the outer kneading drum.

6. The device according to claim 1, wherein the kneading drive includes a drive which is coupled with the drive of the outer kneading drum.

7. The device according to claim 1, wherein the inner kneading drum is connected with the drive of the outer kneading drum so that the inner kneading drum co-rotates with the outer kneading drum.

8. The device according to claim 1, wherein the inner kneading drum and the outer kneading drum are releasably and replaceably disposed on the device, so that kneading drums of various dimensions can be secured to the device.

9. A device for treating and kneading dough, comprising a device according to claim 1, such that the outer kneading drum is surrounded at least partly by a belt on its periphery, and such that dough can be incorporated from a dough drum into the kneading chambers of the device.

* * * * *